United States Patent [19]

Matsuno

[11] Patent Number: 5,793,380

[45] Date of Patent: Aug. 11, 1998

[54] FITTING PARAMETER DETERMINATION METHOD

[75] Inventor: Noriaki Matsuno, Tokyo, Japan

[73] Assignee: NEC Corporation, Tokyo, Japan

[21] Appl. No.: 599,163

[22] Filed: Feb. 9, 1996

[30] Foreign Application Priority Data

Feb. 9, 1995 [JP] Japan ................... 7-021811

[51] Int. Cl.⁶ ................................................. G06F 15/00
[52] U.S. Cl. ................................................. 345/443
[58] Field of Search .............................. 395/140, 141, 395/142, 143; 345/133, 135, 440, 441, 442, 443

[56] References Cited

U.S. PATENT DOCUMENTS

| | | | |
|---|---|---|---|
| 5,566,292 | 10/1996 | Krembs | 395/142 |
| 5,568,601 | 10/1996 | Yamauchi et al. | 395/142 |
| 5,581,679 | 12/1996 | Takahashi et al. | 395/142 |
| 5,594,852 | 1/1997 | Tankelevich | 395/141 |

*Primary Examiner*—Phu K. Nguyen
*Attorney, Agent, or Firm*—Sughrue, Mion, Zinn, Macpeak & Seas, PLLC

[57] ABSTRACT

A method for fitting a large number of data points physically obtained to a fitting straight line or fitting curved line defined by fitting parameters and determining the fitting parameters. The method does not need a least square approximation treatment. The method has the steps of (a) assuming a function of an object of fitting in which parameters are included; (b) determining representatives of the parameters and calculating the number of those of the data points which are present in the proximity of a point defined by a group of predetermined variations of the parameters; and (c) varying the representatives to determine those representatives at which the number of the data points exhibit a highest value and determining the representatives then as the fitting parameters.

10 Claims, 16 Drawing Sheets

5,793,380

FITTING PARAMETER DETERMINATION METHOD

BACKGROUND OF THE INVENTION

1. Field of the Invention

This invention relates to a curve fitting method for fitting a large number of data obtained by a measurement to a straight line or a curved line.

2. Description of the Prior Art

The curve fitting method is a method wherein, based on a large number of discrete data obtained by a series of measurements of physical quantities, a function form which should satisfy the data is assumed and the data are fitted to a straight line or a curved line represented by the function form to determine parameters of the function form so that the straight line or the curved line may represent the data best. The parameters determined in this manner are called fitting parameters. Further, the straight line and the curved line represented with the fitting parameters are called fitting straight line and fitting curved line, respectively. By determining fitting parameters, a physical quantity can be determined which is free from any dispersion in measurement and a rule behind the measurement can be extracted. Since actual measurement data include measurement errors and noise components, fitting parameters cannot be determined so that all data points obtained by the measurement are accurately positioned on a fitting straight line or a fitting curved line. Therefore, the least square approximation method is conventionally used to determine most likely fitting parameters.

In the curve fitting based on the least square approximation method, an error function which represents a degree of incoincidence between data points and a fitting curved line (or fitting straight line) is defined, and the fitting parameters are determined so as to minimize the value of the error function. The error function is generally given as a power sum or a weighted power-sum of the distances between the data points and the fitting straight line or the fitting curved line.

However, the curve fitting based on the least square approximation method has the following problems:

(1): The error function is greatly influenced by a data point which is displaced by a great distance from the fitting straight line or the fitting curved line. Therefore, if the data points involved include several abnormal points which are much different in tendency from the other data points due to a mistake in measurement or due to noise, appropriate curve fitting cannot be performed. In order to eliminate a possible influence of several abnormal points, the abnormal points must be deleted in advance.

(2): If a sequence of data points when plotted on a plane exhibits a distribution of a polygonal line and a desired physical quantity can be obtained by using a part of the data point sequence for the curve fitting, those data points to be used as an object of the curve fitting must be selected from among the data point sequence in advance.

(3): If desired physical quantities are obtained, by dividing a sequence of data points into several sections, performing curve fitting to a polygonal line using straight lines or curved lines different for the individual sections, and obtaining fitting parameters for the individual sections, the data point sequence must be divided into the sections in advance.

The elimination of abnormal points, the selection of data points and the division of a data point sequence into sections described above is difficult to automatically perform and must be performed based on the judgment of data by a human being. However, it is difficult for a human being to collectively process a large amount of data. Further, since selection of data always involves the subjectivity of the human being, the criterion of the selection is inaccurate. Besides, the criterion is not fixed and is unreliable. Even when the elimination of abnormal points, the selection of data points or the division of a data point sequence into sections is automatically involved, some reference or standard is required. However, the reference or standard must be determined arbitrarily after all.

SUMMARY OF THE INVENTION

It is an object of the present invention to provide a method wherein a fitting straight line or a fitting curved line can be determined fully automatically to extract fitting parameters without using an arbitrary reference or standard.

The object of the present invention described above is achieved by a fitting parameter determination method for fitting a plurality of data points obtained by a measurement to a straight line or a curved line to determine fitting parameters, comprising the steps of: assuming a function of an object of fitting in which parameters are included; determining representatives of the parameters and calculating the number of those of the data points which are present in the proximity of a point defined by a group of predetermined variations of the parameters; and varying the representatives to determine those representatives at which the number of the data points exhibit a highest value and determining the representatives then as the fitting parameters.

In the present invention, after the fitting parameters are determined in such a manner as described above, those data points which are present in the proximity of the fitting function defined by the fitting parameters may be extracted, and further fitting may be performed based on the thus extracted data points. In this instance, a conventional method based on the least square approximation can be used for the second fitting. Or, the fitting parameters when applied to a plurality of functions can be determined by determining representatives at which the number of the data points exhibits maximal values and determining those representatives corresponding to a predetermined number of greatest ones of the maximal values as fitting parameters.

According to the fitting parameter determination method of the present invention described above, a fitting straight line or a fitting curved line is determined based on a descending order in number of data points which are present in the proximity of the fitting straight line or the fitting curved line. Accordingly, even if data points which exhibit an extremely different tendency from the other data points are present due to, for example, a mistake in measurement or noise, if the other large number of data points are present in the proximity of a particular straight line or curved line, then a fitting straight line or a fitting curved line can be determined without being influenced by a mistake in measurement or a noise. Accordingly, fitting parameters can be determined without any selection of data in advance from among measurement data which include noise or abnormal data or some other unnecessary data. Also automatic fitting to a plurality of straight lines or curved lines becomes available.

For example, where two physical quantities x and y have a mutually proportional relationship which is represented by a function L: y=ax+b (a and b are fitting parameters), a combination of central values of the parameters a, b of the function L (in FIG. 1, $a=a_0$, $b=0$) are determined in a descending order in number of data points, and a fitting straight line is determined. Therefore, according to the present invention, fitting parameters can be determined without being influenced by any point displaced by a great distance from a fitting straight line or a fitting curved line.

Meanwhile, FIG. 2 illustrates a case wherein the intersecting point with the x-axis of a line obtained by extrapolating a straight line portion L' ($y=a_1 \cdot x + b_1$) which appears when data points are plotted, that is, $x=-b_1/a_1$ in FIG. 2, is a value to be determined. Where the present invention is applied, since a fitting straight line in the proximity of which a possible largest number of data points are present is selected, a straight line for the extrapolation is automatically selected as a fitting straight line, and those data which are not present on the straight line are automatically ignored. Accordingly, desired values can be obtained without the necessity for the designation by a human being of a range of data points which corresponds to a straight line to be used for the extrapolation.

Further, it sometimes occurs that data points exhibit a distribution like a polygonal line as seen in FIG. 3 and different physical quantities are extracted from fitting straight lines (straight lines $L_1$ and $L_2$ in FIG. 3) on the opposite sides of a bent point of the polygonal line. According to the present invention, in such a case, the fitting straight lines on the opposite sides of the bent point are automatically determined without the necessity for the designation of the bent point by a human being.

The above and other objects, features and advantages of the present invention will be apparent from the following description referring to the accompanying drawings which illustrate examples of preferred embodiments of the present invention.

DESCRIPTION OF THE PREFERRED EMBODIMENTS

<<First Embodiment>>

Figure 1:
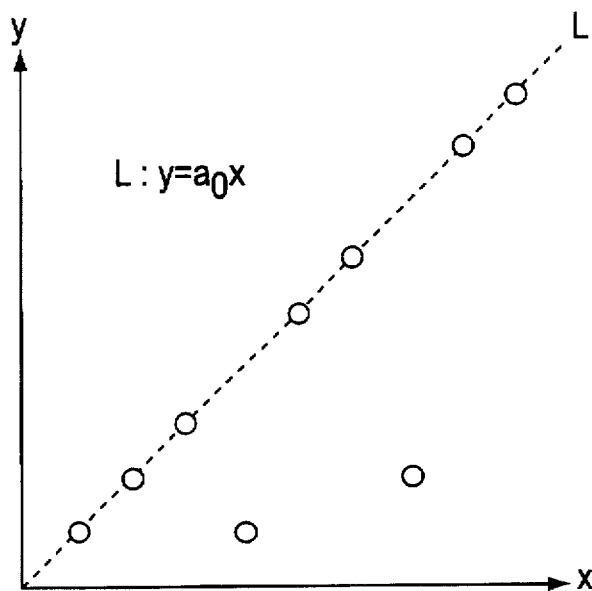
FIG. 1 is a graph illustrating an example of fitting according to the present invention.
Figure 2:
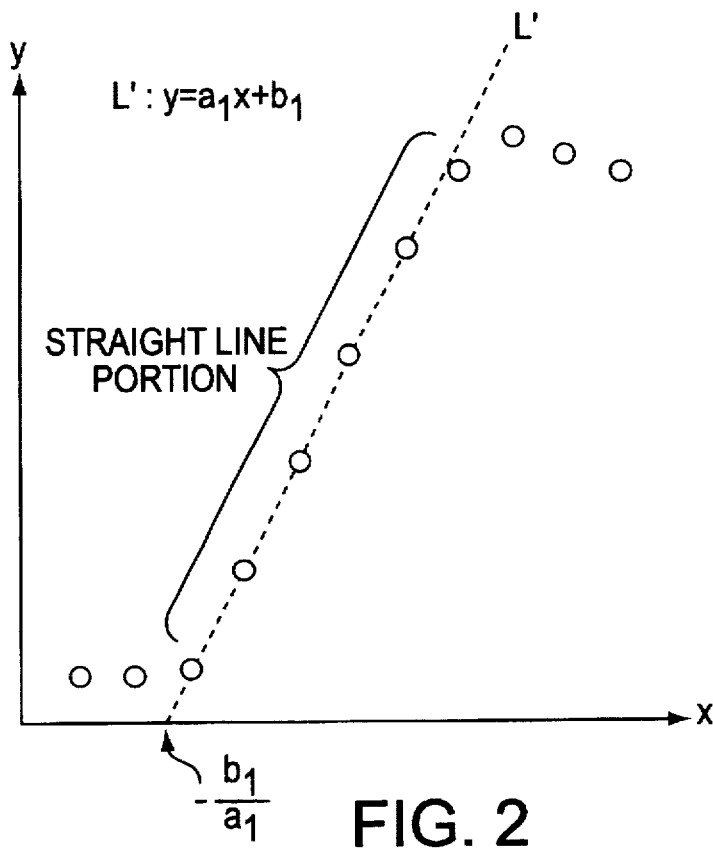
FIG. 2 is a graph illustrating another example of fitting according to the present invention.
Figure 3:
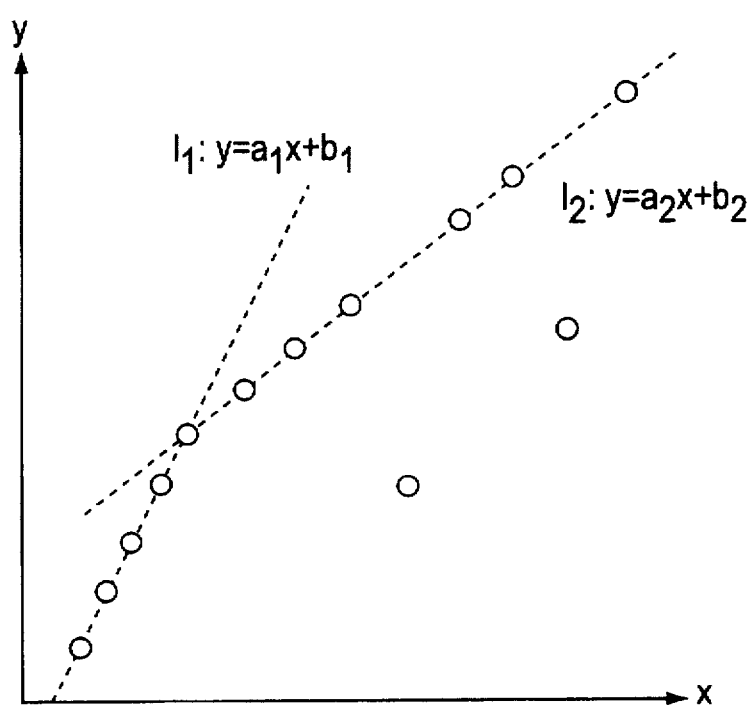
FIG. 3 is a graph illustrating a further example of fitting according to the present invention.
Figure 4:
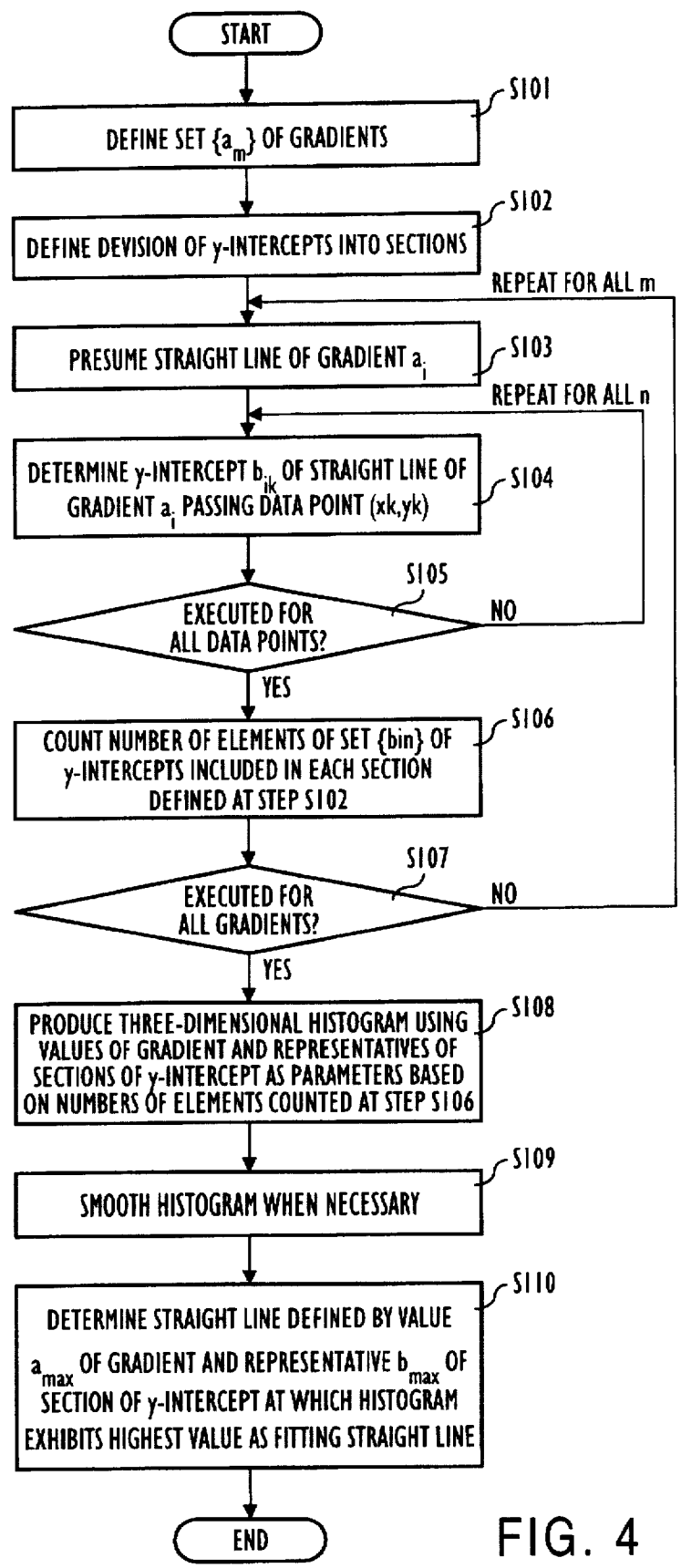
FIG. 4 is a flow chart illustrating a processing procedure by a first embodiment of the present invention.

An example wherein a set $\{(x_n, y_n)\}$ of n data obtained by a measurement are fitted to one straight line L: $y=ax+b$ is described. In the present fitting, the gradient a and the y-intercept b are employed as fitting parameters, and the fitting parameters a, b are determined so that they may represent the set $\{(x_n, y_n)\}$ of data points best. The processing procedure in this instance is illustrated in the flow chart of FIG. 4.

First at step S101, a set $\{a_m\}$ of gradients is defined. The set $\{a_m\}$ includes m different real numbers $a_i$ ($1 \leq i \leq m$), and the individual elements are discrete representatives for the gradient a. Then at step S102, division for the y-intercept into sections is designated. Here, a possible range of the value of the y-intercept, that is, a range that the value of the y-intercept may possibly assume, is divided into a plurality of sections, and a representative for the y-intercept value is determined for the individual sections. Each representative for the y-intercept value may be determined, for example, as value at the center of the section.

Figure 5:
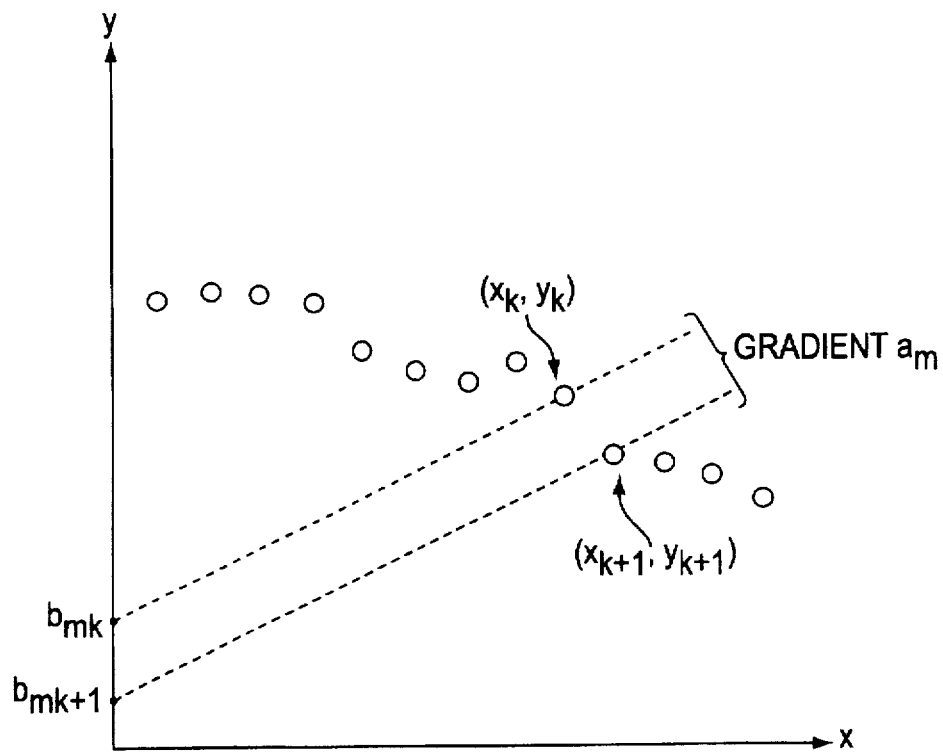
FIG. 5 is a graph illustrating y-intercepts of straight lines passing different data points in the first embodiment.
Figure 6:
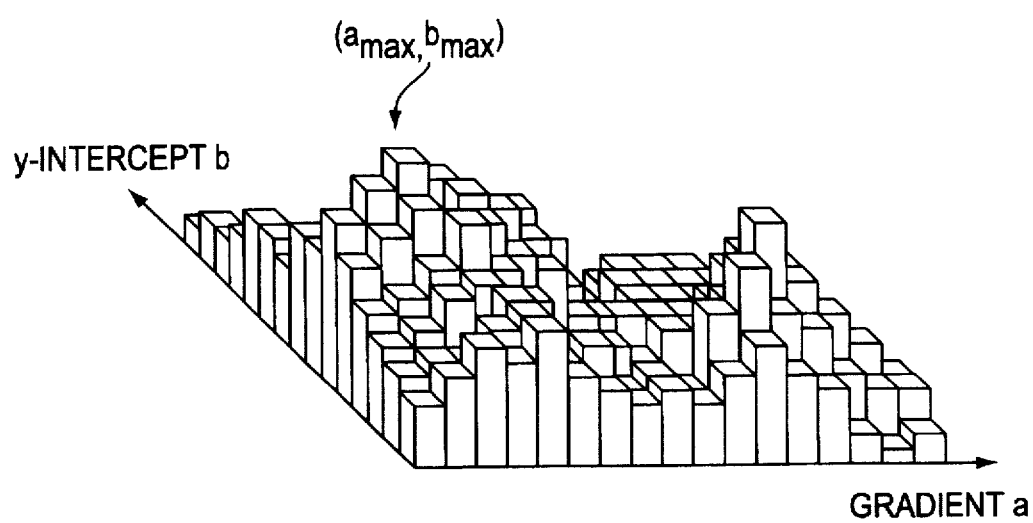
FIG. 6 is a three-dimensional histogram obtained by the first embodiment.

Then at step S103, the element $a_i$ is taken out from the set $\{a_m\}$, and a straight line of the gradient $a_i$ is presumed. At step S104, a straight line $y=a_i \cdot x + b_{ik}$ passing the data point $(x_k, y_k)$ is determined, and the y-intercept value $b_{ik}$ then is calculated. It is discriminated whether or not the processing at step S104 has been performed for all data points (step S105), and the processing at step S104 is repeated for all of the elements of the set $\{(x_n, y_n)\}$. As a result, a set $\{b_{in}\}$ for the y-intercept value including n elements for the gradient $a_i$ is obtained. The relationship between the gradient $a_i$ and the y-intercept value $b_{ik}$ is illustrated in FIG. 5. In FIG. 5, the data points are represented as open circles.

Then at step S106, it is checked to which one of the sections defined at step S102 each of the elements of the set $\{b_{in}\}$ belongs, and the number of the y-intercept values for each of the sections is counted. It is discriminated whether or not the processing beginning with step S103 and ending with step S106 has been executed for all of the gradients (step S107), and the processing beginning at step S103 is repeated for all of the elements of the set $\{a_m\}$. As a result, set $\{b_{mn}\}$ of y-intercept values is obtained.

At step S108, based on the numbers of elements of the set $\{b_{mn}\}$ obtained by the repetitive execution of step S106, a three-dimensional histogram is produced using the value of the gradient and the representative of the y-intercept for each section as parameters. This histogram represents the numbers of data points present in the proximity of straight lines represented with arbitrary gradients and intercepts. At step S109, the three-dimensional histogram is smoothed when considered necessary.

Finally at step S110, the highest point of the histogram is selected, and a pair of the gradient and the y-intercept which present the maximum point are set as $(a_{max}, b_{max})$. As a result, the set $\{(x_n, y_n)\}$ of data points given first can be approximated to a straight line $y=a_{max} \cdot x+b_{max}$ and is fitted to this straight line. In other words, $(a_{max}, b_{max})$ are the fitting parameters obtained.

While the example described above relates to curve fitting based on a straight line, that is, a curved line of the first order, the present invention can be applied also to curve fitting to a curved line of the second order or any higher order or to an exponential curved line. In the following, fitting of a set $\{(x_n, y_n)\}$ of measurement data obtained by a measurement of a physical quantity to a curved line of the second order: $y=ax^2+by+c$ is described.

Upon fitting to a curved line of the second order, a set $\{a_1\}$ of parameters corresponding to the term of the second order of x and another set $\{b_{1m}\}$ of parameters corresponding to the term of the first order of x are prepared. Then, one element is selected from within each of the sets $\{a_1\}$ and $\{b_{1m}\}$, and for each data point $(x_k, y_k)$, a coefficient $c_{1mk}$ corresponding to the y-intercept value is determined based on $$y_k = a_1 \cdot x_k^2 + b_{1m} \cdot x_k + c_{1mk}$$

The coefficient $c_{1mk}$ is calculated for all combinations of the elements of the set $\{a_1\}$ and the elements of the set $\{b_{1m}\}$ to obtain a set $\{c_{1mn}\}$ for the y-intercept value.

Then, the values of the coefficient c are divided into suitable sections, and the number of values in each section is calculated in a similar procedure to that described above to obtain a four-dimensional histogram wherein the values of a, b and c are used as parameters. The fitting parameters are determined from the highest point of the histogram.

Figure 7:
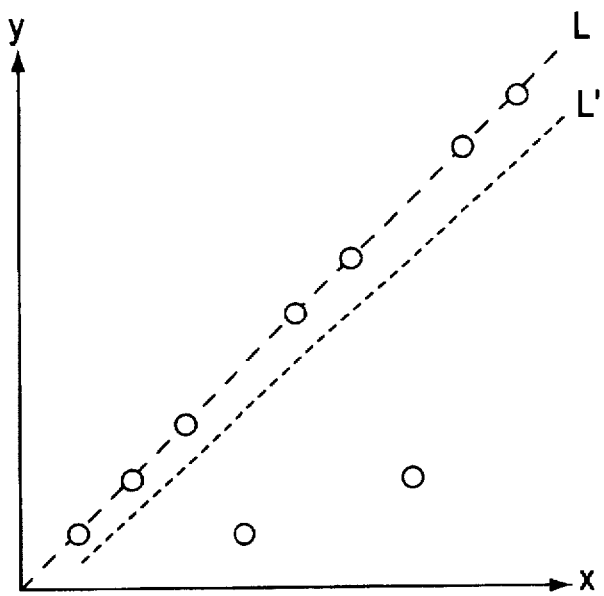
FIG. 7 is a graph illustrating a result of fitting in the first embodiment.

Also in fitting to a curved line represented by a polynomial of the third or higher order, or an exponential curved line represented by $y =a\cdot\exp(bx)$, a similar procedure to that described above may be used.

Where the procedure of the present embodiment is employed, fitting parameters are extracted so that the number of data points present in the proximity of a fitting straight line or a fitting curved line may be maximum. As an example, a case of a set of measured data wherein, as seen in FIG. 7, almost all data elements are present on a certain straight line L (broken line in FIG. 7) while the other data elements are displaced by extremely great distances from the straight line is considered. In FIG. 7, each open circle represents a data point, including those data points which are displaced by extremely great distances from the straight line indicated by a broken line apparently originating from an error in measurement or noise. Accordingly, the straight line L on which the data points other than those data points displaced extremely from the straight line L are positioned is a fitting straight line to be extracted by fitting.

Where a straight line is fitted using the conventional simple least square approximation method, a straight line L' (dotted line in FIG. 7) is displaced by a great amount from the optimum fitting straight line L due to the presence of a comparatively small number of points displaced extremely from the other points. In order to obtain an optimum fitting straight line using the conventional method, the extremely displaced data must be manually deleted in advance. In contrast, in the present embodiment, since the straight line L on which a possible largest number of data points are positioned is extracted as a fitting straight line, an optimum fitting straight line can be determined without the necessity of manual operation of the data in advance.

Next, an example of actual measurement is described. Here, a case is described wherein the threshold value $V_T$ of a field effect transistor (FET) is calculated from the x-intercept of an extrapolation line of a straight line portion of an $(I_D)^{1/2}$ vs. $V_{GS}$ plot where $I_D$ is the drain current of the transistor and $V_{GS}$ is the gate-source voltage of the transistor.

First, the threshold value $V_T$ of the field effect transistor is described.

Figure 8:
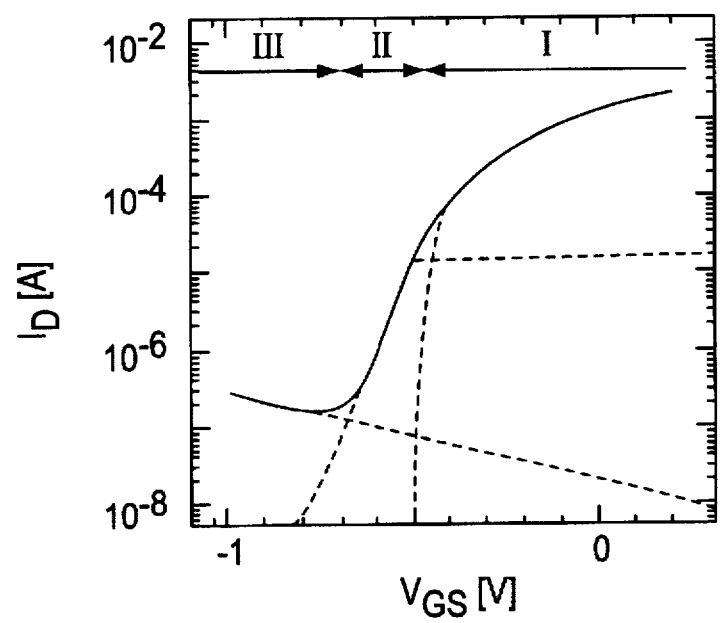
FIG. 8 is a graph showing the $I_D$ vs. $V_{GS}$ characteristic of a field effect transistor.

Generally the $I_D$-$V_{GS}$ characteristic of the field effect transistor is divided into the following three regions (I), (II) and (III) as seen in FIG. 8.

Region (1): a region wherein drift current caused by carriers which are induced in the channel and driven to run by a lateral electric field applied to the channel makes a principal component. When the gate voltage remains within a range from the threshold value $V_T$ to a current saturation point, the drain current $I_D$ is given by:

$$I_D = K(V_{GS-VT})^2/2L_G + I_{SO} + I_{D3}$$

where K is a constant, $L_G$ the gate length, $I_{SO}$ the diffusion current when $V_{GS}=V_T$ and $I_{D3}$ the leak current between the gate and the drain.

Region (II): a region wherein diffusion current caused by a difference in concentration of carriers between the source and the drain while no carrier is induced in the channel makes a principal component. In this region, the drain current ID is given by the following equation:

$$I_D = I_{SO} \cdot \exp\{q(V_{GS}-V_T)/kT\} + I_{D3}$$

where q is the unit electronic charge, k the Boltzmann's constant, and T the temperature as represented in absolute temperature.

Region (III): a region wherein the leak current between the gate and the drain while no carrier is induced in the channel makes a principal component. In this region, the drain current $I_D$ is represented by the following equation:

$$I_D = I_{D3} = -B \cdot V_{GD} \cdot \exp(-q \cdot \delta V_{GD}/kT)$$

where B and δ are constants, and $V_{GD}$ the gate-drain voltage.

Figure 9:
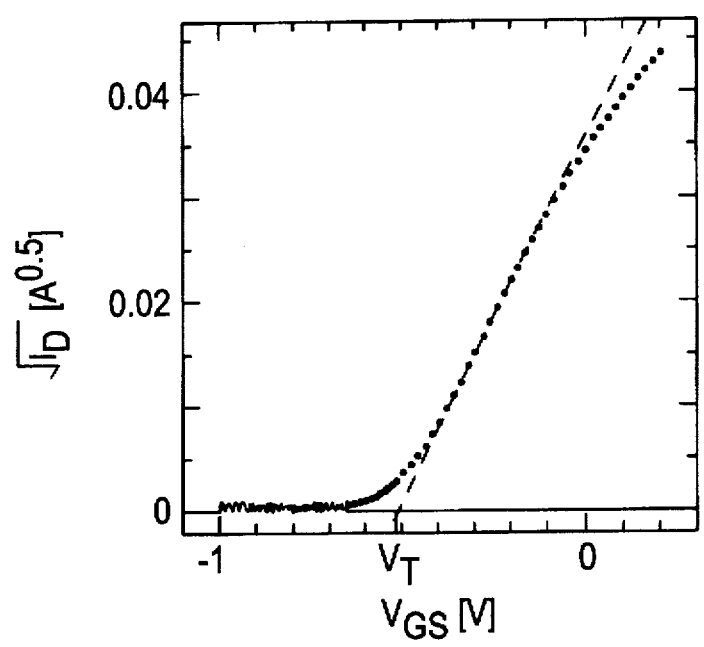
FIG. 9 is a graph illustrating a method of determining threshold value $V_T$ from an $(I_D)^{1/2}$ vs. $V_{GS}$ plot.

The threshold value $V_T$ is defined as the gate voltage when the region (I) is extrapolated so that the current component is reduced to zero. In the region (I), the gate voltage is within the range from the threshold value $V_T$ to the saturation current point, and consequently, the current component increases in proportion to the square of the difference $(V_{GS}-V_T)$ between the gate voltage and the threshold value. Accordingly, the threshold value $V_T$ of the transistor can be calculated from the x-intercept of the extrapolation line of the straight line portion of the $(I_D)^{1/2}$ vs. $V_{GS}$ plot as seen from FIG. 9.

In order to extract the threshold value $V_T$ using the conventional method, fitting must be performed after data in the range of the region (I), that is, data in the range in which the drain current increases in proportion to the square of the difference between the gate voltage and the threshold value, are selected. In contrast, in the present embodiment, a straight line for the extrapolation is selected so that the number of data points present in the proximity may be maximum without the necessity of designation of a data range as an object of extraction. In particular, as seen from FIG. 9, a straight line extending along a straight line portion of the $(I_D)^{1/2}$ vs. $V_{GS}$ plot is extracted, and a correct threshold value $V_T$ is obtained from the value of the x-intercept of the straight line.

<<Second Embodiment>>

In the first embodiment described above, the possible values of the fitting parameters $a_{max}$, $b_{max}$ are discrete depending upon the manner of division into sections upon production of a histogram, and if the step of sections is comparatively large, the accuracy in fitting may not be improved. On the other hand, if the step of sections is set comparatively small while the number of data is comparatively small, then it may be difficult to find out the highest point of a histogram. Therefore, in the present embodiment, after the highest point of a histogram is found out, those data points which are present in the proximity of a straight line or a curved line defined by a pair of fitting parameters which provide the highest point are selected, and fitting parameters are finally determined applying a conventional fitting method such as the least square approximation method to the selected data points.

Figure 10:
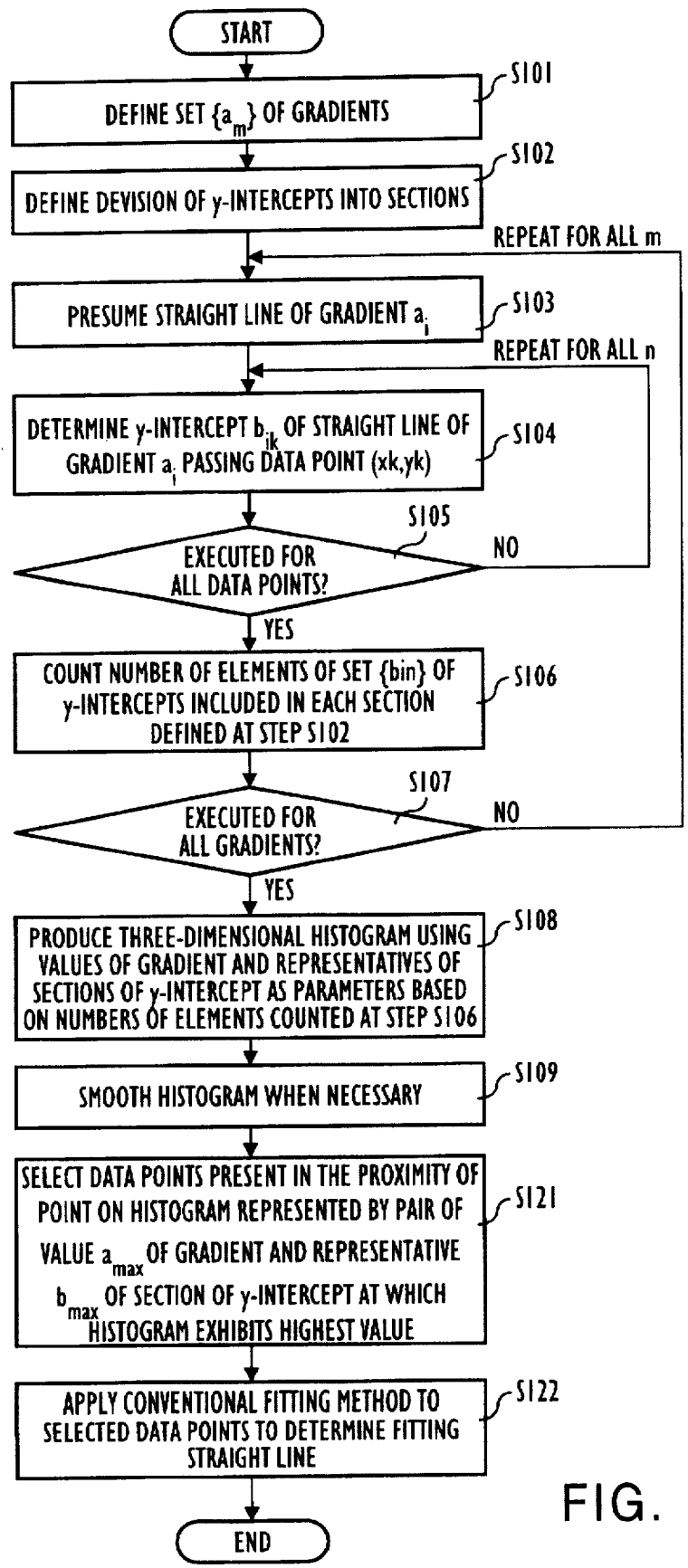
FIG. 10 is a flow chart illustrating a processing procedure in a second embodiment of the present invention.

FIG. 10 illustrates the processing procedure in the second embodiment. The processing up to step S109 in the first embodiment is executed to produce a histogram, and the histogram is smoothed if necessary. Then, at step S121, the value $a_{max}$ of the gradient and the representative $b_{max}$ of the section of the y-intercept when the histogram presents the highest value are determined, and data points which are positioned in the proximity of the point ($a_{max}$, $b_{max}$) on the histogram are selected. Then, at step S122, fitting is performed with the thus selected data points using the conventional least square approximation to finally determine a fitting straight line.

While it is required in the first embodiment to carefully examine the distance in division into sections for production of a histogram in order to assure a high degree of accuracy in fitting, in the second embodiment, the ratio at which the accuracy in fitting relies upon the method of division into sections upon production of a histogram can be reduced.

<<Third Embodiment>>

Figure 11:
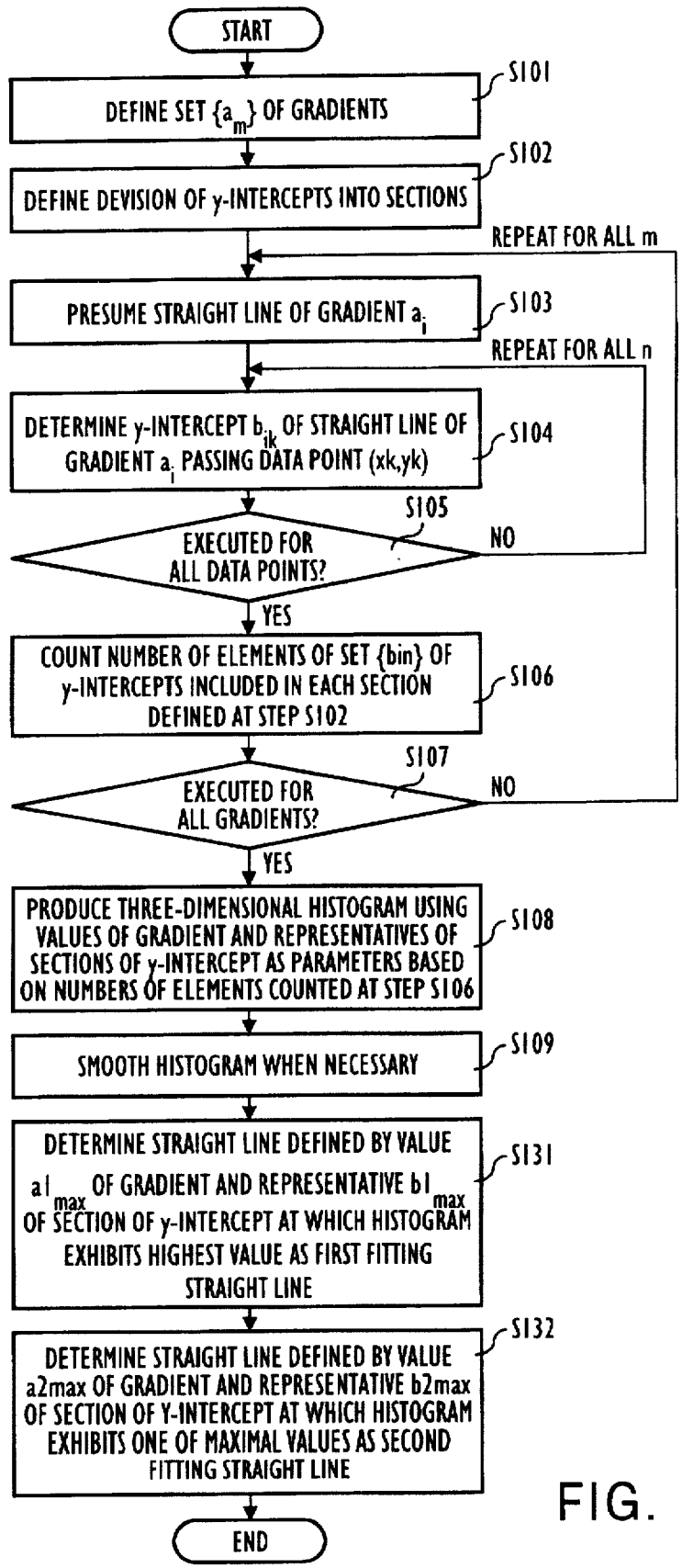
FIG. 11 is a flow chart illustrating a processing procedure in a third embodiment of the present invention.

Next, approximation of a set $\{(x_n, y_n)\}$ of data points obtained by a measurement to a polygonal line with two different straight lines is described. FIG. 11 is a flow chart illustrating the processing procedure in the third embodiment.

Figure 12:
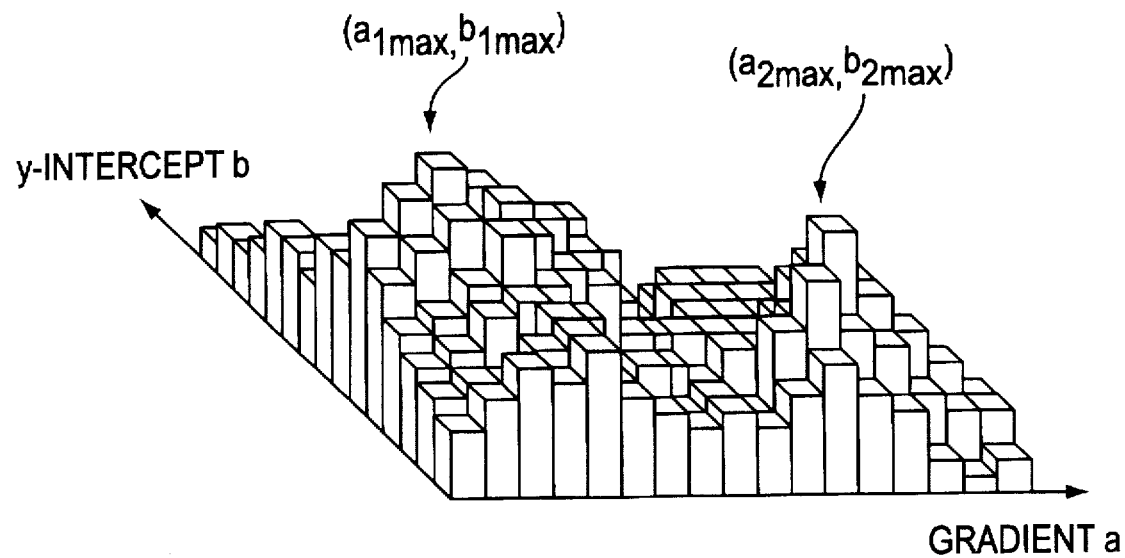
FIG. 12 is a three-dimensional histogram obtained by the third embodiment.

The processing up to step S109 in the first embodiment is executed to produce a three-dimensional histogram wherein the gradient and the y-intercept value are employed as variables, and smoothing is performed if necessary. An example of histogram in this instance is shown in FIG. 12. Then, searching for a maximum point of the histogram is performed, and two points having the highest (first and second highest) maximal values are selected. The pairs of the gradient and the y-intercept which present the two maximal points are set as ($a_{1max}$, $b_{1max}$) and ($a_{2max}$, $b_{2max}$), respectively. Then at step S131, a straight line which is defined by the value $a_{1max}$ of the gradient and the representative $b_{1max}$ of the section of the y-intercept at the point at which the histogram presents the highest value is determined as a first fitting straight line. Then at step S132, another straight line which is defined by the value $a_{2max}$ of the gradient and the representative $b_{2max}$ of the section of the y-intercept at the point at which the histogram presents the second highest value is determined as a second fitting straight line. In this manner, the given data point sequence can be fitted by polygonal line approximation.

If it is intended to perform polygonal line approximation with three or more straight lines, then similar processing to that described above should be performed also using the third or more highest maximal value or values. Further, if a method similar to that described hereinabove in connection with the first embodiment is employed, it is possible to perform fitting connecting two curved lines of the second or higher order or to perform fitting connecting two curved lines of exponential functions. For the polynomial approximation, if a set of parameters is prepared in accordance with the curved line of the highest order, then curved lines of different orders can be connected to perform fitting.

Also in the present embodiment, fitting parameters are extracted so that the number of data points present in the proximity of a fitting straight line or a fitting curved line may be maximum. Further, the least square approximation may be applied additionally as in the second embodiment.

Figure 13:
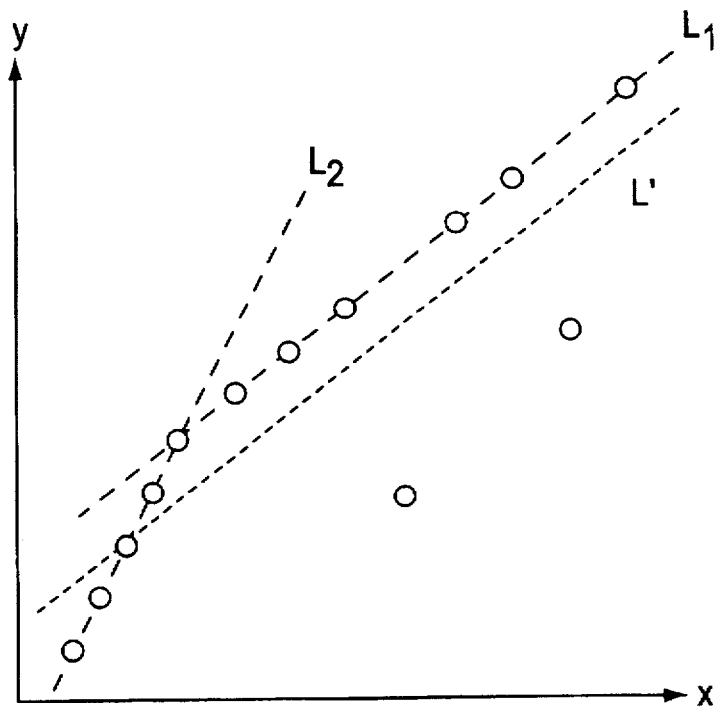
FIG. 13 is a graph illustrating a result of fitting in the third embodiment.

As an example, a case of a set of data points as an object of fitting wherein almost all data elements are present on a single polygonal line and the remaining data elements are displaced by extremely great distances from the polygonal line is described with reference to FIG. 13. Any data point displaced extremely from the polygonal line apparently is noise, and here, it is assumed that a polygonal line on which almost all data points are positioned is a polygonal line to be extracted by fitting. The polygonal line is divided into two straight line segments, which are individually represented as two straight lines $L_1$ and $L_2$ indicated by broken lines in FIG. 13.

If a straight line fitting using the conventional simple least square approximation method is performed, then a single straight line L' (indicated by dotted line in FIG. 13) which is different from both of the straight lines $L_1$ and $L_2$ is extracted. If it is tried to obtain two fitting straight lines using the conventional method, then the least square approximation method must be applied after given data points are manually classified once into data points for the extraction of the straight line $L_1$, data points for the extraction of the straight line $L_2$ and data points which should not be used for the fitting. In contrast, in the present embodiment, the straight lines $L_1$ and $L_2$ themselves on which a possible largest number of data points are positioned are extracted, and besides, no manual data operation in advance is required at all.

In the following, an example is described wherein the output waveform of a ring oscillator including an odd number of cyclically connected inverters is sampled to extract a high level output and a low level output of the inverter at the output stage.

Figure 14:
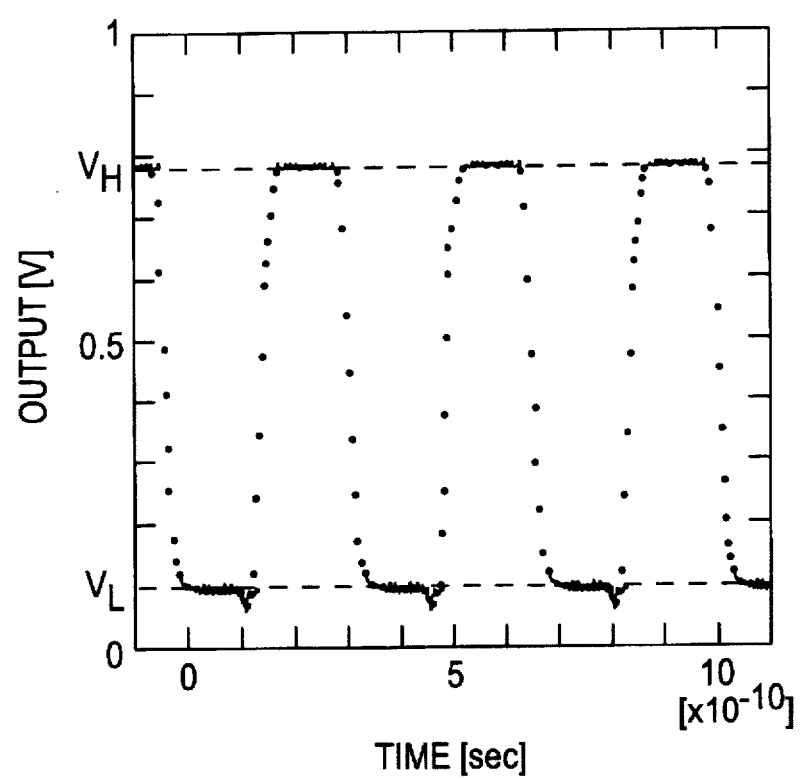
FIG. 14 is a graph showing an output waveform of a ring oscillator in the third embodiment.

In the output waveform of a ring oscillator, a high level output and a low level output of the inverter at the output stage appear alternately as seen in FIG. 14. Accordingly, if a section of the output waveform shown in FIG. 14 in which the gradient is zero is extracted, then a high level output or a low level output of the inverter is obtained. In the present example, adding the condition that the section involved is a straight line of the gradient of zero, searching for two maximal points of the histogram at which the gradient value is zero and the number of data points is comparatively great is performed, and two straight lines corresponding to the low level and the high level are extracted from the thus searched out two maximal points. In particular, in the present embodiment, as a straight line in the proximity of which the greatest number of data points are present and which has the gradient of zero, a straight line which has a y-intercept corresponding to a high level output of the inverter is extracted. Then, as another straight line in the proximity of which the second greatest number of data points are present and which has the gradient of zero, another straight line which has a y-intercept corresponding to a low level output of the inverter is extracted. From the y-intercepts of the two straight lines, outputs of two logical states are extracted. On the other hand, when the conventional fitting method is applied to all data points shown in FIG. 14, only an average value of the output can be obtained.

<<Fourth Embodiment>>

Figure 15:
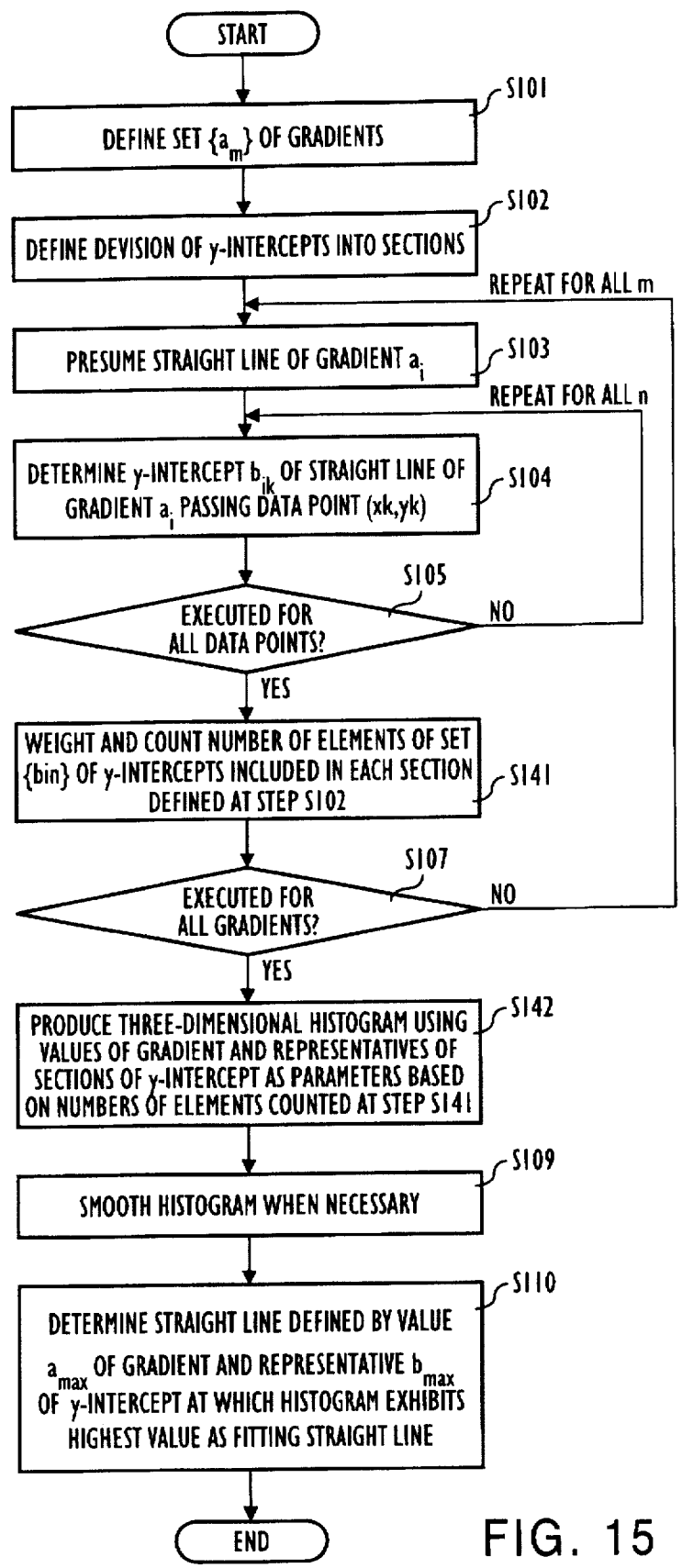
FIG. 15 is a flow chart illustrating a processing procedure in a fourth embodiment of the present invention.

Weighting to data to make, when the distribution of data points is not uniform or a like case, the contributions of individual data points uniform is described with reference to FIG. 15.

The processing at steps S101 to S105 in the first embodiment is executed to calculate the y-intercept values $b_{ik}$ of all data points corresponding to straight lines of the gradients $a_i$. Then at step S141, it is checked to which ones of the sections defined at step S102 the elements of the set $\{b_{in}\}$ individually belong, and the numbers of the y-intercept values of the individual sections are calculated. In this instance, the counting is performed after the numbers of elements are weighted.

Then, it is discriminated whether or not the processing at steps S104, S105 and S141 has been performed for all gradients (step S107), and the processing from step S103 is repeated for all of the elements of the set $\{a_m\}$. Consequently, a set $\{b_{mn}\}$ for the y-intercept value is obtained.

At step S142, based on the numbers of elements of the set $\{b_{mn}\}$ obtained by the repetitive execution of the processing at step S141, a three-dimensional histogram is produced wherein the value of the gradient and the representative in each section of the y-intercept are employed as parameters. Thereafter, smoothing is performed if necessary (step S109) and a fitting straight line is extracted (step S110) similarly as in the first embodiment.

Now, as an example wherein weighting of data is performed, a case is described wherein data measured at equal frequency intervals are fitted to a straight line having a fixed gradient by a logarithmic plot. Here, it is assumed that data are fitted to a straight line having the gradient of −20 dB/dec. "dB/dec." is a unit used to represent a variation amount per 10 times a frequency in units of decibel.

Figure 16:
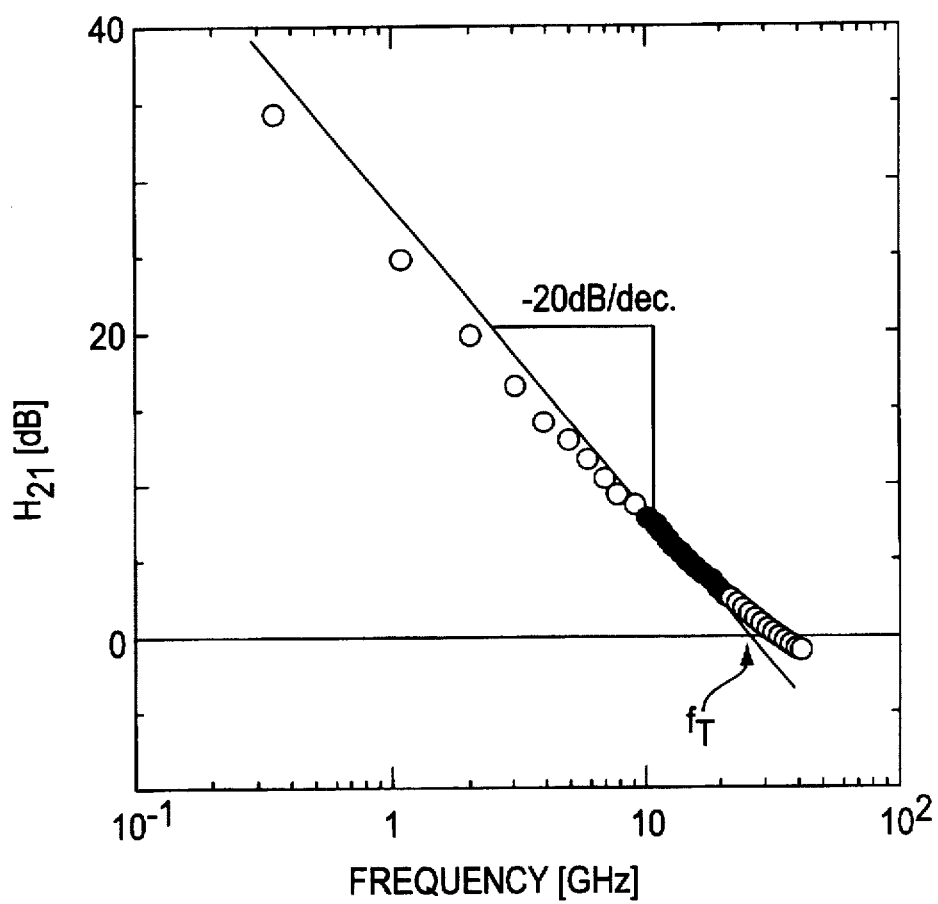
FIG. 16 is a graph illustrating a result of fitting when no weighting to data is performed.
Figure 17:
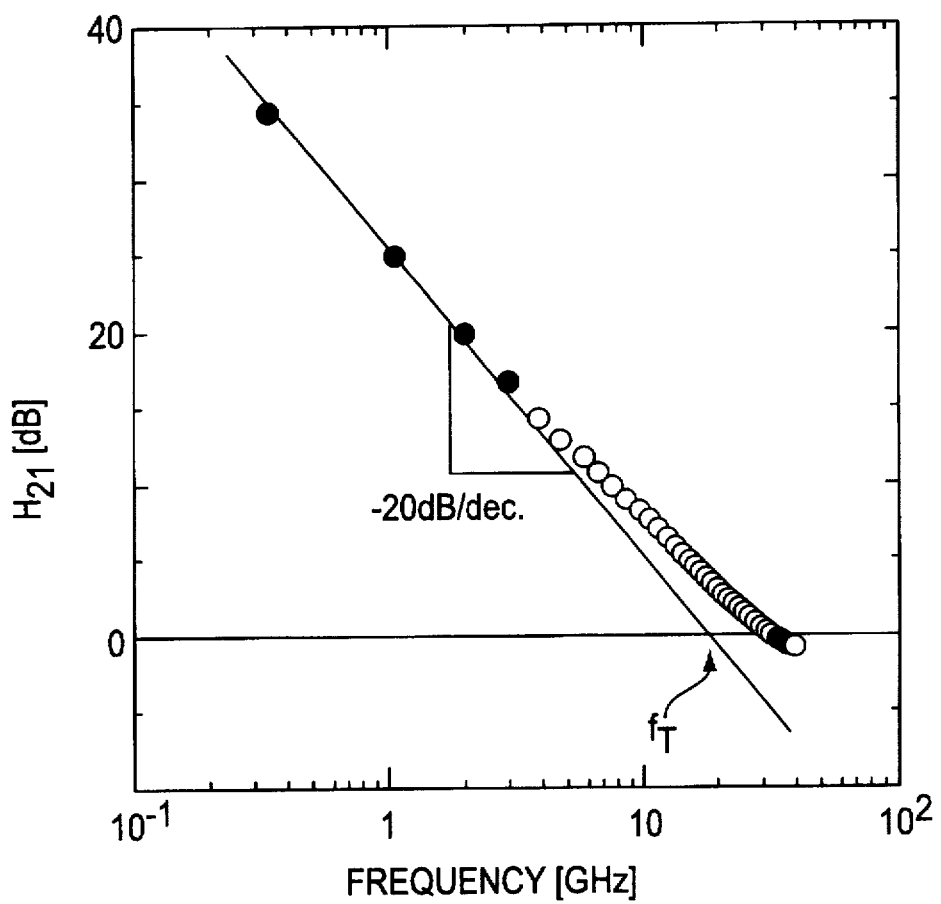
FIG. 17 is a graph illustrating a result of fitting in the fourth embodiment.

FIG. 16 is a graph when weighting is not performed (corresponding to the first embodiment) while FIG. 17 is a graph when weighting is performed (corresponding to the fourth embodiment). Since the graphs are obtained by logarithmic plotting, as the frequency increases, the interval between data points decreases. Where weighting is not performed, importance is attached to data on the higher frequency side as seen in FIG. 16, and as a result, data on the lower frequency side exhibit greater amounts of displacement from the fitting straight line. In contrast, in the graph shown in FIG. 17, the data have been weighted using the interval between data points on the logarithmic plot as the weighting function. More particularly, the weighting function then is represented by the following equation:

$$W = \log\{(f+\Delta f)/f\}$$

where f is the frequency, and $\Delta f$ is the frequency interval upon measurement. The interval between data points on the logarithmic plot is represented by W. If $\Delta f=0.1$ [GHz], then W=0.0414 at f=1 [GHz], and W=0.00432 at f=10 [GHz]. Accordingly, if the value of the weighting function is used in place of the number of data points, then data at f=1 [GHz] are evaluated with the weight of approximately 10 times that of data at f=10 [GHz]. By using such weighting function, the situation that the data interval on the higher frequency side is reduced so that excessive importance is attached to data on the higher frequency side is prevented.

As a concrete example, a case is described wherein the transition frequency $f_T$ of a field effect transistor is calculated based on the frequency dependency of the output short-circuit current gain $H_{21}$ of the transistor. The transition frequency $f_T$ is defined as a frequency at which the absolute value of the output short-circuit current gain $H_{21}$ is zero. However, with an actual device, the actually measured value of the absolute value of $H_{21}$ is higher than its theoretical value in a high frequency region due to an influence of a parasitic impedance and so forth. Therefore, making use of the fact that the frequency characteristic of the absolute value of $H_{21}$ theoretically makes a straight line of −6 dB/oct. in a logarithmic plot, an extrapolated line of a straight line portion of −6 dB/oct. of the logarithmic plot of the absolute values of $H_{21}$ is determined, and the transition frequency $f_T$ is calculated from an intersecting point between the extrapolated line and a 0 dB line. "dB/oct." is a unit used to represent a variation amount per two times a frequency in units of decibel.

Figure 18:
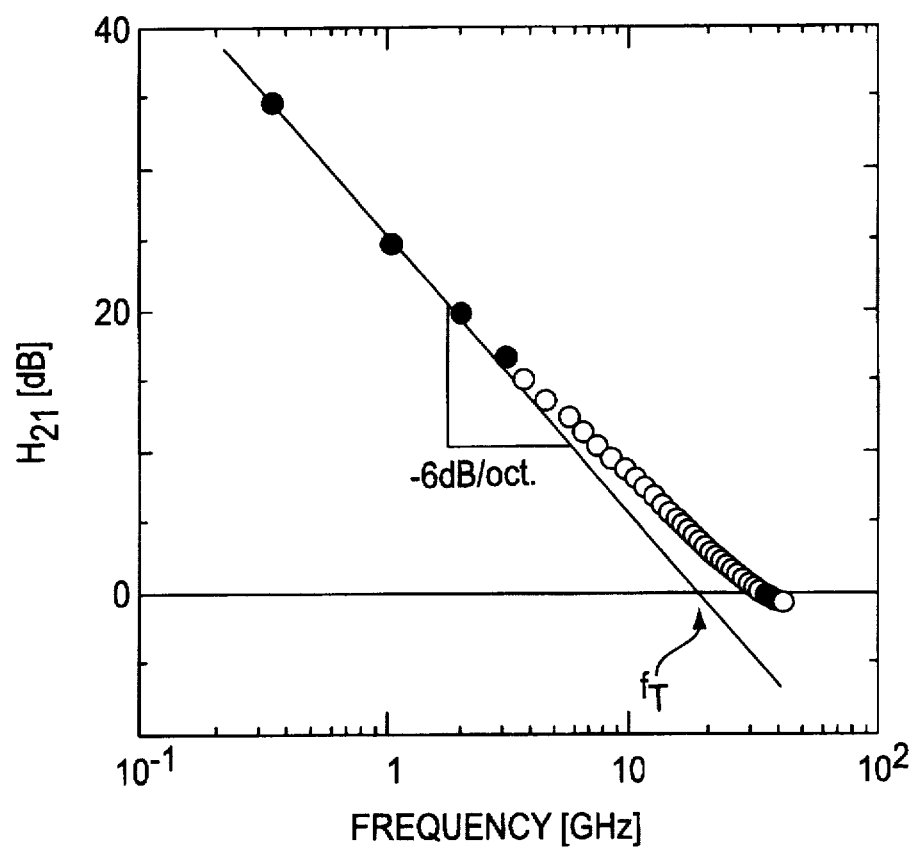
FIG. 18 is a graph illustrating a result of fitting upon determination of a transition frequency $f_T$ in the fourth embodiment.
Figure 19:
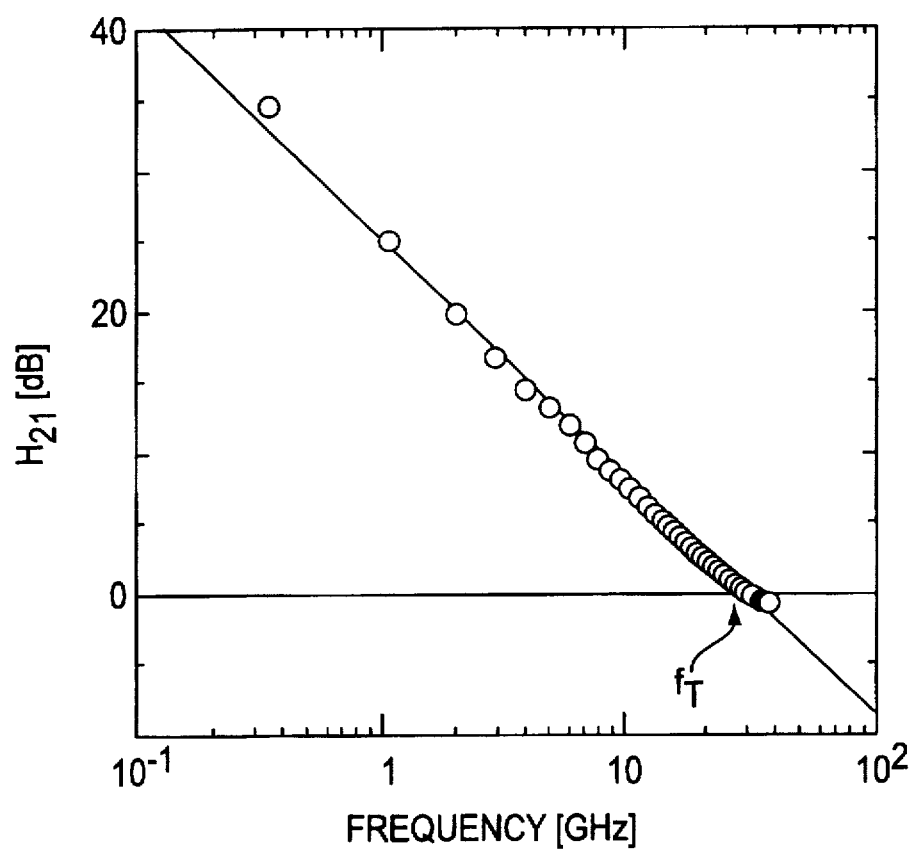
FIG. 19 is a graph illustrating a result of fitting upon determination of a transition frequency $f_T$ not based on weighting to data.

FIG. 18 is a graph which represents the numbers of data obtained by a measurement of the output short-circuit current gain $H_{21}$ at an equal frequency interval in the form of a logarithmic plot, and indicates a result of fitting when weighting is performed with the data point interval on the logarithmic plot. Meanwhile, FIG. 19 indicates a result of fitting when no such weighting is performed (corresponding to the first embodiment). Here, since the measurement has been performed at an equal frequency interval, the data point density increases as the frequency increases. Therefore, the number of plotted points is greater in a region of the frequency higher than 20 GHz in which the gradient is moderate. When no weighting is performed, the extrapolated line is determined so that it passes a portion in which the gradient is moderate, that is, a portion in which the data are influenced significantly by a parasitic impedance or the like, as seen in FIG. 19, and the transition frequency $f_T$ is evaluated higher than actual. In contrast, when weighting is performed, the extrapolated line is determined as an extension of a line of the original gradient as seen in FIG. 18, and the transition frequency $f_T$ is evaluated correctly.

In order to perform fitting using the conventional least square approximation method, the data range which corresponds to the straight line portion of −6 dB/oct. which is an object of fitting must be designated in advance by a human being, and besides, the gradient of the straight line extracted need not necessarily be equal to −6 dB/oct.

Figure 20:
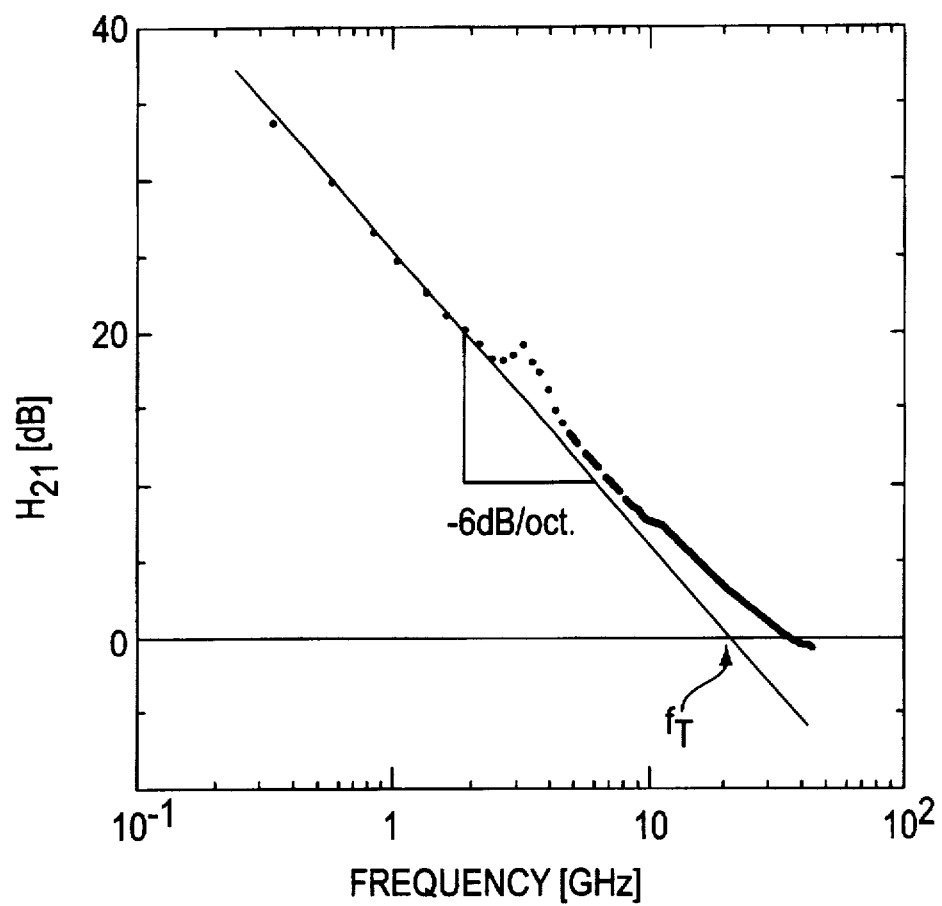
FIG. 20 is a graph illustrating another result of fitting for determination of a transition frequency $f_T$ in the fourth embodiment.

FIG. 20 shows an example wherein the transition frequency $f_T$ is determined based on the frequency dependency of the output short-circuit current gain $H_{21}$ of a field effect transistor similarly as in the case of FIG. 18. However, the output short-circuit current gain $H_{21}$ exhibits a peak in the proximity of 3 GHz due to incomplete calibration of the measurement system. This peak is provided by data obtained apparently by inappropriate measurement. When determining the transition frequency $f_T$, the peak must be ignored. When the conventional method is employed, data points in the proximity of the peak must be eliminated in advance from the object of fitting. However, in the present embodiment, since the extrapolated line is so selected that the number of data points present in the proximity of it may be the greatest, data points in the proximity of the peak are automatically ignored. As a result, the transition frequency $f_T$ is evaluated correctly as seen from FIG. 20.

As apparent from the embodiments described above, according to the present invention, optimum fitting to a large number of discrete data points obtained by a measurement can be performed without the necessity for any manual selection of data in advance. By applying the fitting parameter determination method of the present invention to a system which includes a combination of a data processing apparatus with an automatic measurement instrument, processing from measurement to data analysis can be automated fully. As a result, it is possible to collectively measure a large amount of measurement samples and process data of the samples. Further, since no subjectivity of a human being is involved in the determination of fitting parameters, the criterion of selection of a data range can be made definite, and also the accuracy of fitting parameter determined is improved.

It is to be understood that variations and modifications of the fitting parameter determination method disclosed herein will be evident to those skilled in the art. It is intended that all such modifications and variations be included as are within the scope of the appended claims.

What is claimed is:

1. A fitting parameter determination method for fitting a plurality of data points obtained by a measurement to a line, comprising the steps of:
   (a) assuming a function of an object of fitting in which parameters are included;
   (b) determining representatives of the parameters;
   (c) calculating a number of the data points which are present in a proximity of a line defined by a group of predetermined variations of the parameters; and
   (d) varying the representatives to determine fitting parameters, said fitting parameters corresponding to the representatives at which the number of the data points exhibits a highest value.

2. The fitting parameter determination method according to claim 1, further comprising weighting of the numbers of the data points.

3. The fitting parameter determination method according to claim 2, wherein the data points are obtained by measuring a frequency f characteristic of a field effect transistor at an equal frequency interval Δf, and the weighting is performed using a weighting function W defined by $$W = \log\{(f+\Delta f)/f\}.$$

4. The fitting parameter determination method according to claim 1, wherein the data points are obtained by measuring a drain current $I_D$ and a gate-source voltage $V_{GS}$ of a field effect transistor, and said function is assumed as representing a straight line defined by variables of $(I_D)^{1/2}$ and $V_{GS}$.

5. A fitting parameter determination method for fitting a plurality of data points obtained by a measurement to a line, comprising the steps of:
   (a) assuming a function of an object of fitting in which parameters are included;
   (b) determining representatives of the parameters;
   (c) calculating a number of the data points which are present in a proximity of a line defined by a group of predetermined variations of the parameters;
   (d) varying the representatives to determine candidate values, said candidate values corresponding to the representative at which the number of the data points exhibits a maximum value;
   (e) extracting the data points which are present in a proximity of the function when the candidate values are used as the parameters; and
   (f) performing fitting for the extracted data points to determine fitting parameters.

6. A fitting parameter determination method for fitting a plurality of data points obtained by a measurement to a plurality of lines, comprising the steps of:
   (a) assuming a plurality of functions of an object of fitting in which parameters are included;
   (b) determining representatives of the parameters;
   (c) calculating a number of the data points which are present in a proximity of a line defined by a group of predetermined variations of the parameters; and
   (d) varying the representatives to determine maximal values, said maximal values corresponding to said representatives at which the number of the data points exhibits a local maximum value; and
   (e) determining fitting parameters, said fitting parameters corresponding to a predetermined number of greatest of the maximal values.

7. The fitting parameter determination method according claim 6, wherein the data points are obtained by measuring a time variation of an output signal of a ring oscillator, and said functions are assumed as two functions representing straight lines indicating a high level output and a low level output of the ring oscillator.

8. A fitting parameter determination method for fitting a plurality of data points obtained by a measurement to a predetermined number of functions each representing a line, comprising the steps of:
   (a) assuming the functions in which a first parameter and a second parameter are included;
   (b) dividing a range of possible values of the second parameter into a plurality of sections;
   (c) determining a representative for the second parameter for each of the sections;
   (d) determining a representative for the first parameter;
   (e) substituting, using the representative for the first parameter, for each of the data points, a value of said each data point into the functions to obtain computed values of the second parameter;
   (f) checking to which of the sections the computed second parameter values belong to calculate a number of the data points in each of the sections;
   (g) repeating said steps (d), (e), and (f) discretely varying the representative for the first parameter;
   (h) producing a histogram wherein the representative for the first parameter and the representative for the second parameter are used as independent variables and the number of the data points in each of the sections is used as a dependent variable;
   (i) finding a predetermined number of highest maximal values of the histogram; and
   (j) determining fitting parameters corresponding to the predetermined number of the functions, said fitting parameters corresponding to the representatives for the first and second parameters associated with the maximal values.

9. The fitting parameter determination method according to claim 8, further comprising the steps of:
   extracting the data points which are present in a proximity of the fitting functions represented by the fitting parameters determined at the step (j); and
   performing fitting using the extracted data points.

10. The fitting parameter determination method according to claim 8, further comprising weighting the number of the data points of each of the sections.

* * * * *